(12) United States Patent
Revutskii et al.

(10) Patent No.: US 11,297,611 B2
(45) Date of Patent: Apr. 5, 2022

(54) DEVICES AND METHODS FOR ENCODING DOWNLINK CONTROL INFORMATION IN A COMMUNICATION NETWORK

(71) Applicant: Huawei Technologies Co., Ltd., Shenzhen (CN)

(72) Inventors: Vadim Andreevich Revutskii, Moscow (RU); Jie Jin, Moscow (RU); Oleg Feat'evich Kurmaev, Moscow (RU); Aleksei Eduardovich Maevskii, Moscow (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 84 days.

(21) Appl. No.: 16/832,697

(22) Filed: Mar. 27, 2020

(65) Prior Publication Data

US 2020/0229164 A1 Jul. 16, 2020

Related U.S. Application Data

(63) Continuation of application No. PCT/RU2017/000719, filed on Sep. 29, 2017.

(51) Int. Cl.
*H04W 72/04* (2009.01)
*H04L 1/00* (2006.01)
(Continued)

(52) U.S. Cl.
CPC ......... *H04W 72/042* (2013.01); *H04L 1/0061* (2013.01); *H04W 28/04* (2013.01); *H04L 1/0072* (2013.01); *H04W 48/08* (2013.01)

(58) Field of Classification Search
CPC ... H04L 1/0061; H04L 1/0072; H04L 1/0041; H04L 5/0053; H04L 1/0071;
(Continued)

(56) References Cited

U.S. PATENT DOCUMENTS 9,762,683 B2    9/2017  Karampurwala et al.
2010/0034139 A1*  2/2010  Love ..................... H04L 1/0057
                                                   370/328
(Continued)

FOREIGN PATENT DOCUMENTS

CN    101594205 A    12/2009
CN    102355293 A     2/2012
(Continued)

OTHER PUBLICATIONS

Nokia et al., "Handling DCI formats and blind decoding in LTE-Advanced," 3GPP Draft; R1-101415, San Francisco, USA, XP050598069, Feb. 22-26, 2010, 7 pages.
(Continued)

*Primary Examiner* — Oussama Roudani
(74) *Attorney, Agent, or Firm* — Conley Rose, P.C.

(57) ABSTRACT

A communication transmitter for transmitting a control message over a physical downlink control channel (PDCCH) towards a communication entity in a mobile communication network, wherein the communication transmitter comprises a processor configured to process a control block to obtain the control message, wherein the control block includes a first portion and a second portion, wherein the first portion includes downlink control information bits indicating information relating to data transmission over the mobile communication network, and insert prefix error detection code bits into the second portion of the control block to obtain the control message, and a communication interface configured to transmit the control message over the mobile communication network and a communication receiver for receiving the control message from the communication transmitter over the communication network.

20 Claims, 10 Drawing Sheets

(51) Int. Cl.
*H04W 28/04* (2009.01)
*H04W 48/08* (2009.01)

(58) Field of Classification Search
CPC .. H04L 1/0068; H04W 72/042; H04W 28/04; H04W 48/08; H04W 28/18
See application file for complete search history.

(56) References Cited

U.S. PATENT DOCUMENTS

| | | | |
|---|---|---|---|
| 2012/0201216 A1* | 8/2012 | Wu | H04L 5/0053 370/329 |
| 2012/0327904 A1 | 12/2012 | Park et al. | |
| 2013/0195047 A1* | 8/2013 | Koivisto | H04L 1/0061 370/329 |
| 2018/0092082 A1 | 3/2018 | Tie et al. | |
| 2018/0343668 A1* | 11/2018 | Ogawa | H04L 5/0064 |

FOREIGN PATENT DOCUMENTS

| | | |
|---|---|---|
| CN | 103731236 A | 4/2014 |
| CN | 105897373 A | 8/2016 |
| EP | 2496023 A1 | 9/2012 |
| EP | 3026957 A1 | 6/2016 |
| WO | 2016206003 A1 | 12/2016 |
| WO | 2017050197 A1 | 3/2017 |

OTHER PUBLICATIONS

Qualcomm Incorporated, "Views on DCI Contents and Formats", 3GPP TSG RAN WG1 NR AdHoc#3, R1-1716417, XP051339872, Nagoya, Japan, Sep. 18-21, 2017, 3 pages.

LG Electronics, "Discussion on configurability of DCI contents," 3GPP TSG RAN WG1 Meeting #89; R1-1707633, Hangzhou, P.R. China, XP051272840, May 15-19, 2017, 4 pages.

Ericsson, "On Aggregation Levels and DCI Formats," 3GPP TSG-RAN WG1 Meeting#88bis; R1-1706030, Spokane, USA, XP051252289, Apr. 3-7, 2017, 2 pages.

Huawei, et al., "Evaluation of two-stage downlink control structure," 3GPP TSG RAN WG1 Meeting #88, R1-1703363, Athens, Greece, Feb. 13-17, 2017, 4 pages.

"3rd Generation Partnership Project; Technical Specification Group Radio Access Network; Evolved Universal Terrestrial Radio Access (E-UTRA); Physical layer procedures (Release 13)," 3GPP TS 36.213 V13.3.0, Sep. 2016, 385 pages.

Ericsson, "On Aggregation Levels and DCI Formats", 3GPP TSG-RAN WG1 #88, R1-1703286, Athens, Greece, Feb. 13-17, 2017, 2 pages.

MCC Support, "Final Report of 3GPP TSG RAN WG1 #90" v1.0.0 (Prague, Czech Rep, Aug. 21-25, 2017), 3GPP TSG RAN WG1 Meeting #90bis, R1-1716941, Prague, Czech Rep, Oct. 9-13, 2017, 172 pages.

MCC Support, "Final Report of 3GPP TSG RAN WG1 #AH_NR2 v1 0.0 (Qingdao, China, Jun. 27-30, 2017)," 3GPP TSG RAN WG1 Meeting #90, R1-1712032, Prague, Czech Rep, Aug. 21-25, 2017, 109 pages.

MCC Support, "Final Report of 3GPP TSG RAN WG1 #88v1.0.0, Athens, Greece, Feb. 13-17, 2017," 3GPP TSG RAN WG1 Meeting #88bis, R1-1704172, Spokane, USA, Apr. 3-7, 2017, 153 pages.

Kurmaev, O., "Constant-Weight and Constant-Charge Binary Run-Length Limited Codes," IEEE Trans. Inf. Theory, vol. 57, No. 7, Jul. 2011, pp. 4497-4515.

Shannon, C.E., "A Mathematical Theory of Communication," Bell System Technical Journal, vol. 27, No. 3, Jul. 1948, pp. 379-423.

Fano, R.M., "The Transmission of Information," Technical Report No. 65, Cambridge, Mass., USA: Research Laboratory of Electronics at MIT, Mar. 17, 1949, 37 pages.

Huffman, D., et al.,. "A Method for the Construction of Minimum-Redundancy Codes," Proceedings of the IRE, vol. 40, No. 9, Sep. 1952, pp. 1098-1101.

Ytrehus, O., et al., "Upper Bounds on Error-Correcting Runlength-Limited Block Codes," IEEE Trans. Inf. Theory, vol. 37, No. 3, May 1991, pp. 941-945.

Immink, K.A.S., "Codes for Mass Data Storage Systems," 2nd ed. Eindhoven, The Netherlands: Shannon Found., 2004, 362 pages.

Zehavi, E., "On Runlength Codes," IEEE Trans. Inf. Theory, vol. 34, No. 1, Jan. 1988, pp. 45-54.

* cited by examiner

| i \ j | 0 | 1 | 2 | 3 | 4 | 5 | 6 | 7 | 8 | ... |
|---|---|---|---|---|---|---|---|---|---|---|
| 0 | 1 | 1 | 1 | | | | | | | |
| 1 | 1 | 0 | 0 | 0 | | | | | | |
| 2 | 0 | 1 | 0 | 0 | 0 | | | | | |
| 3 | 0 | 0 | 1 | 0 | 0 | 0 | | | | |
| 4 | 0 | 0 | 0 | 1 | 1 | 1 | 1 | | | |
| 5 | 0 | 0 | 0 | 1 | 1 | 0 | 0 | 0 | | |
| 6 | 0 | 0 | 0 | 1 | 0 | 1 | 0 | 0 | 0 | |
| 7 | 0 | 0 | 0 | 1 | 0 | 0 | 1 | 0 | 0 | 0 |
| 8 | 0 | 0 | 0 | 1 | 0 | 0 | 0 | 1 | 1 | 1 1 |
| ⋮ | ⋮ | | | ⋮ | | | | | | ⋱ |

FIG. 5

DEVICES AND METHODS FOR ENCODING DOWNLINK CONTROL INFORMATION IN A COMMUNICATION NETWORK

CROSS-REFERENCE TO RELATED APPLICATIONS

This application is a continuation of International Patent Application No. PCT/RU2017/000719 filed on Sep. 29, 2017, which is hereby incorporated by reference in its entirety.

TECHNICAL FIELD

In general, the present application relates to mobile communication. In particular, the present application relates to a transmitter and a receiver as well as corresponding methods for indicating a length of a control information block (CIB) in a physical downlink control channel (PDCCH) of a mobile communication network.

BACKGROUND

In Long-Term Evolution (LTE) networks, a user equipment (UE) blindly decodes messages of a PDCCH known as downlink control information (DCI), since the UE has no information about the exact parameters of the code. The UE can perform multiple attempts in order to decode received data according to all possible code lengths and information lengths for the current transmission mode. This procedure is known as blind decoding or blind detection (BD) of the DCI.

For the standardization of $5^{th}$ generation (5G) mobile networks, the PDCCH will be realized on the basis of the LTE architecture and a BD procedure will be employed. It is foreseeable that the complexity of the BD procedure will increase as the possible information lengths grow.

In the LTE networks, two different DCI formats and accordingly two information lengths of codes for the PDCCH can be used in one transmission mode. However, the complex structure of the PDCCH in the 5G networks requires more different DCI formats than in the LTE networks (see HUAWEI, HiSilicon, "Evaluation of two-stage downlink control structure", 3GPP TSG RAN WG1 Meeting #88, R1-1703363, Athens, Greece, 2017). Herewith, the 3rd Generation Partnership Project (3GPP) agreement restricts a maximum number of the BD in the 5G systems to 44 per time slot as in the LTE network systems, as discussed in the specification 3GPP TS36.213 v13.3.0 r13; RAN1 Chairman's Notes, 3GPP TSG RAN WG1 NR Ad-Hoc#2, 2017; and RAN1 Chairman's Notes, 3GPP TSG RAN WG1 Meeting #90, 2017.

To reduce the number of the BD attempts in 5G New Radio (NR) systems, a small set of DCI formats will be used, i.e. two lengths as 20 or 60, as discussed in "Ericsson, On Aggregation Levels and DCI Formats", 3GPP TSG-RAN WG1 #88, R1-1703286, 2017 and in the final report of 3GGP TSG RAN WG1 #88 v.1.0.0. Thus, NR-PDCCH messages, i.e. CIB are placed inside the DCI with a fixed length. In such case, the CIB can have a variable size and the UE does not know its size exactly. It is thus necessary to indicate the actual length of CM for the UE to realize UE-signaling by the NR-PDCCH.

The state-of-the-art scheme for CIB-length indication is based on a use of a header inside the DCI and the header directly carries information about the length of the useful DCI part to the UE, as shown in FIG. 1 and as discussed in "Ericsson, On Aggregation Levels and DCI Formats", 3GPP TSG-RAN WG1 #88, R1-1703286, 2017. In this regard, the DCI header is not protected and some of inner DCI bits are not used.

However, the state-of-the-art scheme of direct indication has a main problem, where errors in the header inside the DCI lead to erroneous indication of the CIB length for the UE. Without additional protection of the informative part or header, this results in poor performance of the false alarm rate (FAR) in the downlink control channel even though a cyclic redundancy check (CRC) protection can be provided.

In light of the above, there is a need for improved devices and methods for indicating the length of the CIB of the PDCCH in an efficient and accurate manner.

SUMMARY

It is an object of the application to provide improved devices and methods which enable an efficient determination of the length of the CIB of the PDCCH.

The foregoing and other objects are achieved by the subject matter of the independent claims. Further implementation forms are apparent from the dependent claims, the description and the figures.

Generally, the application relates to a transmitter and a receiver as well as corresponding methods for reliable indication of a length of the CM to support low length number of the DCI. Further, embodiments of the application can utilize all unused bits of the inner DCI in order to reduce the FAR in the PDCCH without increasing redundancy and by keeping reasonable complexity for UE signaling at the same time.

In order to enable efficient determination of the CIB, unused DCI bits in a PDCCH message can be replaced with code words generated on the basis of a prefix error-detection code (PEDC) that may have a minimal Hamming distance equal to 2. The PEDC is a code comprising words of variable lengths (minimum 3 bits), and the code bits do not depend on control information presented in the DCI. The PEDC comprises a unique word for each possible length. As a result, detection of a certain code word can uniquely define the length of the CIB. Construction of the PEDC can be performed by direct formulae for constructing every code word independently of other words, which can generate necessary PEDC code words for a variable set of the CIB lengths adhering the necessary minimal Hamming distance.

The PEDC enables efficient determination of the CIB because the decoded code bits do not belong to the information bits of the CIB. In this way, information bits of the CIP and thus, the CIB block can simply and efficiently be captured, e.g. by excluding the decoded code bits from the PDCCH message.

Furthermore, according to a first aspect the application relates to a communication transmitter for transmitting a control message over a PDCCH towards a communication entity in a mobile communication network. The communication transmitter comprises a processor configured to process a control block (i.e., a control frame) to obtain the control message, the control block having a first portion and a second portion, the first portion comprising DCI bits indicating information relating to data transmission over the mobile communication network, wherein the processor is configured to insert prefix error detection code bits into the second portion of the control block to obtain the control message. The communication transmitter also comprises a communication interface configured to transmit the control message over the mobile communication network.

Thus, an improved communication transmitter is provided, wherein the length of the CIB of the DCI can in an efficient and accurate manner be determined upon decoding the prefix code at the receiver as mentioned above.

In a further possible implementation form of the first aspect, the processor is configured to replace digital bits of the second portion by the prefix error detection code bits in order to insert the prefix error detection code bits into the second portion.

In a further possible implementation form of the first aspect, the processor is configured to calculate at least one parity bit upon the basis of the DCI bits, and to insert the calculated parity bit into the second portion of the control block to obtain the control message.

In a further possible implementation form of the first aspect, the processor is configured to generate the prefix error detection code bits independently of the DCI bits.

In a further possible implementation form of the first aspect, the processor is configured to generate the prefix error detection code bits to obtain a code word having a Hamming distance which is larger than 1.

In a further possible implementation form of the first aspect, the processor is configured to generate by direct formulae or to select the prefix error detection code bits from a predetermined set of code words, in particular from a predetermined set of code words with a variable length.

In a further possible implementation form of the first aspect, the communication transmitter is arranged to transmit the control message in a certain transmission mode of a plurality of transmission modes, wherein the processor is configured to generate or select the prefix error detection code bits from the predetermined set of code words, a number of prefix error detection code bits depending on the certain transmission mode.

In a further possible implementation form of the first aspect, the communication interface is configured to transmit the control message according to the LTE transmission scheme.

In a further possible implementation form of the first aspect, the communication transmitter is a base station.

According to a second aspect the application relates to a communication receiver for receiving a control message over a communication network, wherein the control message comprises a control block, the control block comprises a first portion and a second portion, the first portion comprises DCI bits indicating information relating to data transmission over the mobile communication network, and the second portion comprises prefix error detection code bits. The communication receiver comprises a communication interface, in particular an LTE communication interface, being configured to receive the control message over the communication network, and a processor being configured to decode the prefix error detection code bits of the second portion to detect the first portion of the control block.

Thus, an improved communication receiver is provided, wherein the length of the CIB of the DCI can be determined in an efficient and accurate manner.

In a further possible implementation form of the second aspect, the processor is configured to decode the prefix error detection code bits in order to obtain decoded bits, and to discard the decoded bits in the control block in order to detect the first portion in the control block.

In a further possible implementation form of the second aspect, the first portion comprises at least one parity bit, the parity bit being associated with, in particular generated from, the prefix error detection code bits, wherein the processor is configured to detect the prefix error detection code bits upon the basis of the at least one parity bit.

According to a third aspect the application relates to a transmission method for transmitting a control message over a PDCCH towards a communication entity in a mobile communication network. The method comprises processing a control block to obtain the control message, the control fame having a first portion and a second portion, the first portion comprising DCI bits indicating information relating to data transmission over the mobile communication network, wherein the processing comprises inserting prefix error detection code bits into the second portion of the control block to obtain the control message, and transmitting the control message over the mobile communication network.

According to a fourth aspect the application relates to a receiving method for receiving a control message over a communication network, the control message comprising a control block, the control block comprising a first portion and a second portion, the first portion comprising DCI bits indicating information relating to data transmission over a mobile communication network, the second portion comprising prefix error detection code bits. The receiving method comprises receiving the control message over the communication network, and decoding the prefix error detection code bits of the second portion to detect the first portion of the control block.

According to a fifth aspect the application relates to a computer program product with a program code for performing the method of the third or fourth aspect, when the program code is executed on a computer.

The application can be implemented in hardware and/or software.

BRIEF DESCRIPTION OF THE DRAWINGS

Further some embodiments of the application will be described with respect to the following figures.

FIG. 5 shows a schematic diagram of a code space of a PEDC used by a communication transmitter or receiver according to an embodiment;

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present application may be placed. It will be appreciated that other aspects may be utilized and structural or logical changes may be made without departing from the scope of the present application. The following detailed description, therefore, is not to be taken in a limiting sense, as the scope of the present application is defined by the appended claims.

For instance, it will be appreciated that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures.

Moreover, in the following detailed description as well as in the claims embodiments with different functional blocks or processing units are described, which are connected with each other or exchange signals. It will be appreciated that the present application covers embodiments as well, which include additional functional blocks or processing units that are arranged between the functional blocks or processing units of the embodiments described below.

Finally, it is understood that the features of the various exemplary aspects described herein may be combined with each other, unless noted otherwise.

Figure 1:
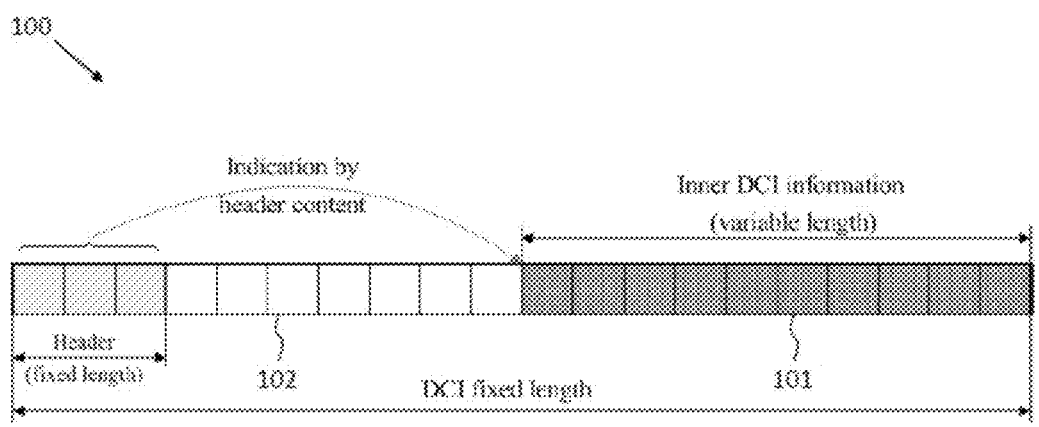
FIG. 1 shows a schematic diagram illustrating a scheme of direct indication of length of a CIB.
Figure 2:
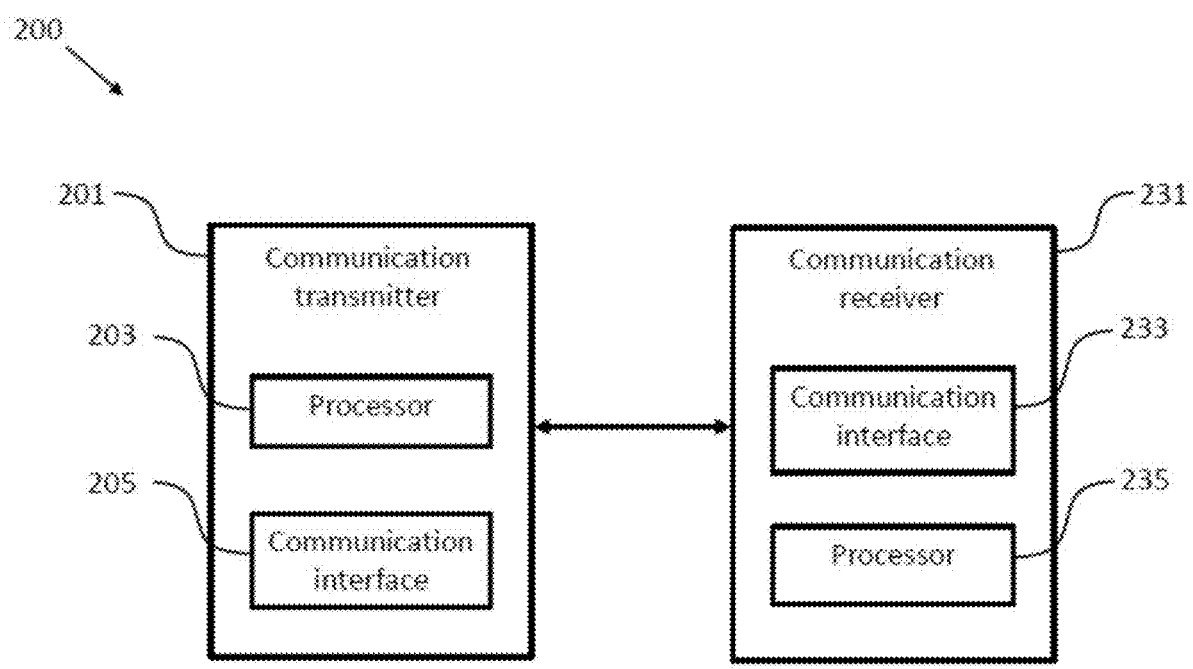
FIG. 2 shows a schematic diagram illustrating a cellular communication network according to an embodiment.

FIG. 2 shows a schematic diagram illustrating a cellular communication network 200 comprising a communication transmitter 201 according to an embodiment and a communication receiver 231 according to an embodiment, wherein the communication transmitter 201 is used for transmitting a control message over a PDCCH towards a communication entity in the cellular communication network 200 and the communication receiver 231 for receiving the control message.

In an exemplary embodiment, the communication transmitter 201 can be implemented in a base station and the communication receiver 231 can be implemented in a UE.

As can be seen from FIG. 2, the communication transmitter 201 comprises a processor 203 configured to process a control block 100 to obtain the control message and a communication interface 205 configured to transmit the control message over the mobile communication network 200 according to the LTE transmission scheme, wherein the control fame 100 has a first portion 101 and a second portion 102, the first portion 101 comprising DCI bits indicating information relating to data transmission over the mobile communication network 200.

The processor 203 is further configured to insert prefix error detection code bits into the second portion 102 of the control block 100 to obtain the control message. Furthermore, the processor 203 is configured to replace digital bits of the second portion 102 by the prefix error detection code bits in order to reliably indicate the length of the first portion 101 according to an embodiment.

According to an embodiment, the processor 203 is configured to calculate one parity bit 103 upon the basis of the DCI bits, and to insert the calculated parity bit 103 into the second portion 102 of the control block 100 to obtain the control message.

According to a further embodiment, the processor 203 is configured to generate the prefix error detection code bits independently of the DCI bits and to obtain a code word having a Hamming distance larger than 1.

According to a further embodiment, the processor 203 is configured to generate by direct formulae or to select the prefix error detection code bits from a predetermined set of code words, wherein these code words are of variable lengths.

According to a further embodiment, the communication transmitter 201 is arranged to transmit the control message in a certain transmission mode of a plurality of transmission modes, wherein the processor 203 is configured to generate by direct formulae or select the prefix error detection code bits from the predetermined set of code words, wherein a number of prefix error detection code bits depending on the length of the first portion 101.

As shown in FIG. 2, the communication receiver 231 for receiving the control message comprises a communication interface 233, in particular an LTE communication interface 233, being configured to receive the control message over the communication network 200, and a processor 235 being configured to decode the prefix error detection code bits of the second portion 102 to define the length of the first portion 101 of the control block 100.

According to an embodiment, the processor 235 is configured to decode the prefix error detection code bits in order to obtain the length of the first portion 101, and to discard the decoded bits in the control block 100 in order to detect the first portion 101 in the control block 100.

According to a further embodiment, the second portion 102 comprises one parity bit 103, the parity bit 103 being associated with, in particular generated from, the first portion 101, wherein the processor 235 is configured to detect an error upon the basis of the first portion 101 and the parity bit 103.

According to an embodiment, the length of the CIB in the DCI can be indicated by a special PEDC with variable lengths (minimum 3 bits). The PEDC code word can replace all unused inner bits 102 of the DCI, and the prefix code word can take the role of the DCI header. An implementation form of the PEDC in the DCI is further explained in details in FIG. 3.

Figure 3:
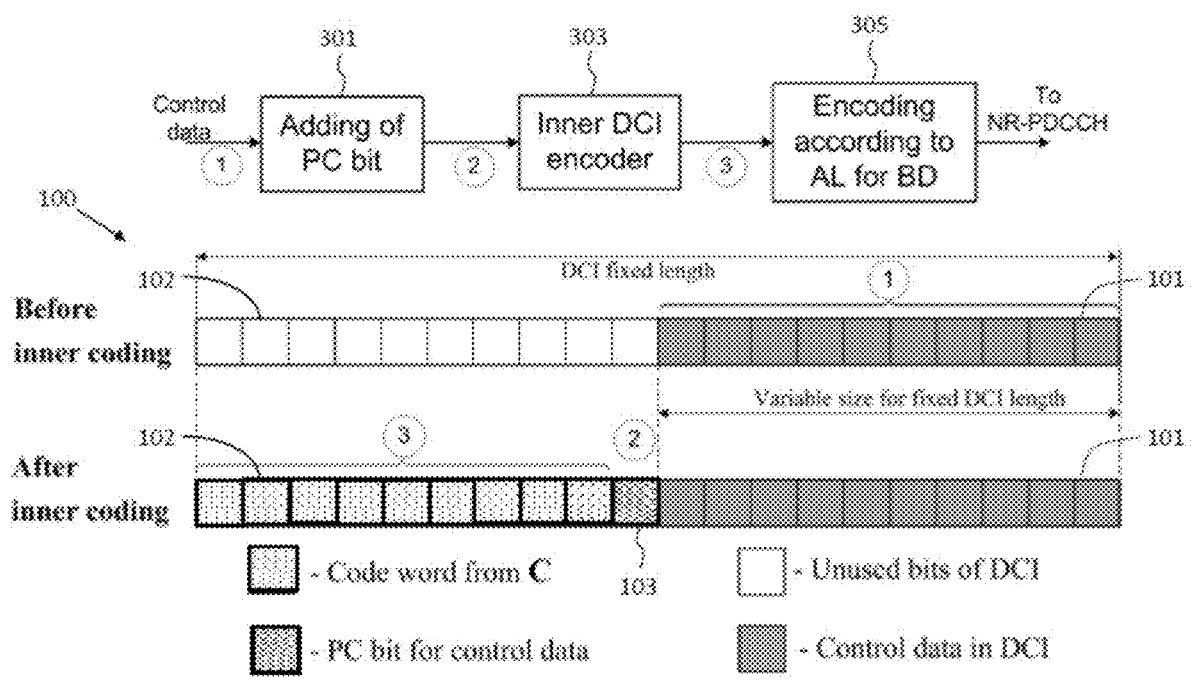
FIG. 3 shows a schematic diagram summarizing the procedure for inner DCI encoding at the transmitting side according to an embodiment.

FIG. 3 shows a schematic diagram summarizing the procedure for inner DCI encoding at the transmitting side according to an embodiment. The procedure shown in FIG. 3 at the transmitting side, e.g. in the base station, comprises the following steps.

Step 301. One parity check (PC) bit 103 can be calculated for the informative part of the DCI and added for replacing one of the unused bits 102 of the inner DCI.

Step 303. The set of remaining unused bits 102 inside the DCI is replaced with a code word C of the PEDC characterized by a minimal Hamming distance more than 1 and calculated independently of the informative DCI content.

Step 305. The DCI with a fixed size are coded by the PEDC with a specific length according to a current aggregation level (AL) in the NR-PDCCH.

Figure 4:
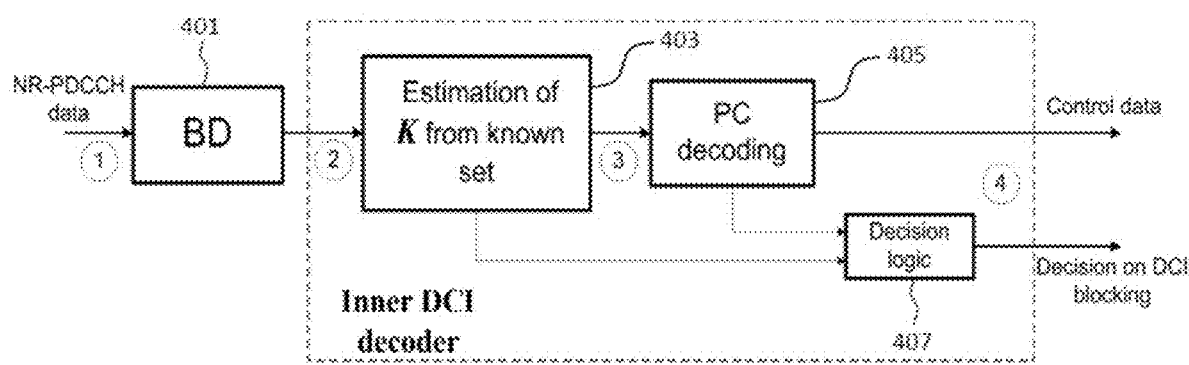
FIG. 4 shows a schematic diagram summarizing the procedure for inner DCI decoding at the receiving side according to an embodiment.

FIG. 4 shows a schematic diagram summarizing the procedure for inner DCI decoding at the receiving side according to an embodiment. The procedure shown in FIG. 4 comprises the following steps.

Step 401. The BD is first performed.

Step 403. After CRC passing and detection of the DCI, the UE defines which word from the PEDC is presented in the DCI.

Step 405. The PC is then performed according to the estimated length of the CIB K, wherein K belongs to a predefined set.

Step 407. A decision about the DCI acceptability is made, which relies on the results of the previous steps.

As the result, the fact of the certain code-word detection uniquely defines the number of the unused bits 102 in the DCI and thus the length of the CIB. One main advantage according to the embodiments of the application is indication of the CIB length in a more reliable and accurate manner by the use of all unused DCI bits 102 by replacing them with the special prefix code with a minimal Hamming distance larger than 1. The construction of the prefix code C will be described in details further below.

According to an embodiment, to provide noise immunity of a CIB length indication, the prefix code C (used as a header) with a variable length should have a minimal Hamming distance higher than "1". This prefix code C is characterized by the properties, the prefix code C is a code with code words of variable lengths and code bits do not depend on the control information in the DCI, secondly, the minimal Hamming distance of the prefix code C is equal to "2", thirdly, the prefix code C has a unique word for each possible length, and finally, the set L of the prefix code lengths is directly defined from Xth transmission mode (TMx).

The PEDC used in the embodiments of the application can be generated by direct equations based on minimal-weight expressions as shown in "*Constant-Weight and Constant-Charge Binary Run-Length Limited Codes*", O. F. Kurmaev, IEEE Trans. Inf. Theory, vol. 57, no. 7, pp. 4497-4515, July 2011. These equations include:

$$C_j(i) = \begin{cases} 1, i \in u_v \\ 0, \text{otherwise} \end{cases}, i = 0, \ldots, L_j, L_j = m + j; \quad (1)$$

$$u_j(v) = v + \begin{cases} j - \lceil j/(m+1) \rceil, j < (v+1)(m+1) \\ m(v+1), \text{otherwise} \end{cases}, v = 0, \ldots, V_j; \quad (2)$$

$$V_j = \begin{cases} m + j/(m+1), j \bmod (m+1) = 0; \\ \lceil j/(m+1) \rceil, \text{otherwise}, \end{cases} \quad (3)$$

wherein m=3 is the minimal length of prefix code word, $V_j$ is the number of "1" (weight) in jth code word $C_j$ with length $L_j$, $u_j(v)$ is the index of with nonzero position in jth code word of the PEDC.

FIG. 5 shows a schematic diagram of a code space of the PEDC used by the communication transmitter 201 or receiver 231 according to an embodiment. As can be seen in the code space, every ith bit in jth code word is defined by (1, 2, 3).

Through the code construction described above, every code word of the prefix-code C can be calculated independently of the other code words, which can generate necessary prefix-code space for a current set L of the CIB lengths in a variable transmission mode of the 5G network system.

Figure 6:
FIG. 6 shows a schematic diagram of a selected code space of a PEDC used by a communication transmitter or receiver according to an embodiment.

An example of using the PEDC for additional inner DCI encoding at the transmitting side is illustrated in FIG. 6, which shows a schematic diagram of a selected code space of a PEDC used by the communication transmitter 201 or receiver 231 according to an embodiment.

As can be seen in FIG. 6, some of the code words from the code space in FIG. 5 are selected according to every possible CIB length. The unused bits of the DCI are replaced by the code word of the prefix code C. These code words include the features, the minimal length of a code word in the prefix code C is 3 bits, the minimal Hamming distance is "2", and the set of code word lengths is 3, 5, 6, 8, 9.

The above scheme for encoding the inner part of the DCI can be used at the transmitting side of a communication system.

Figure 7:
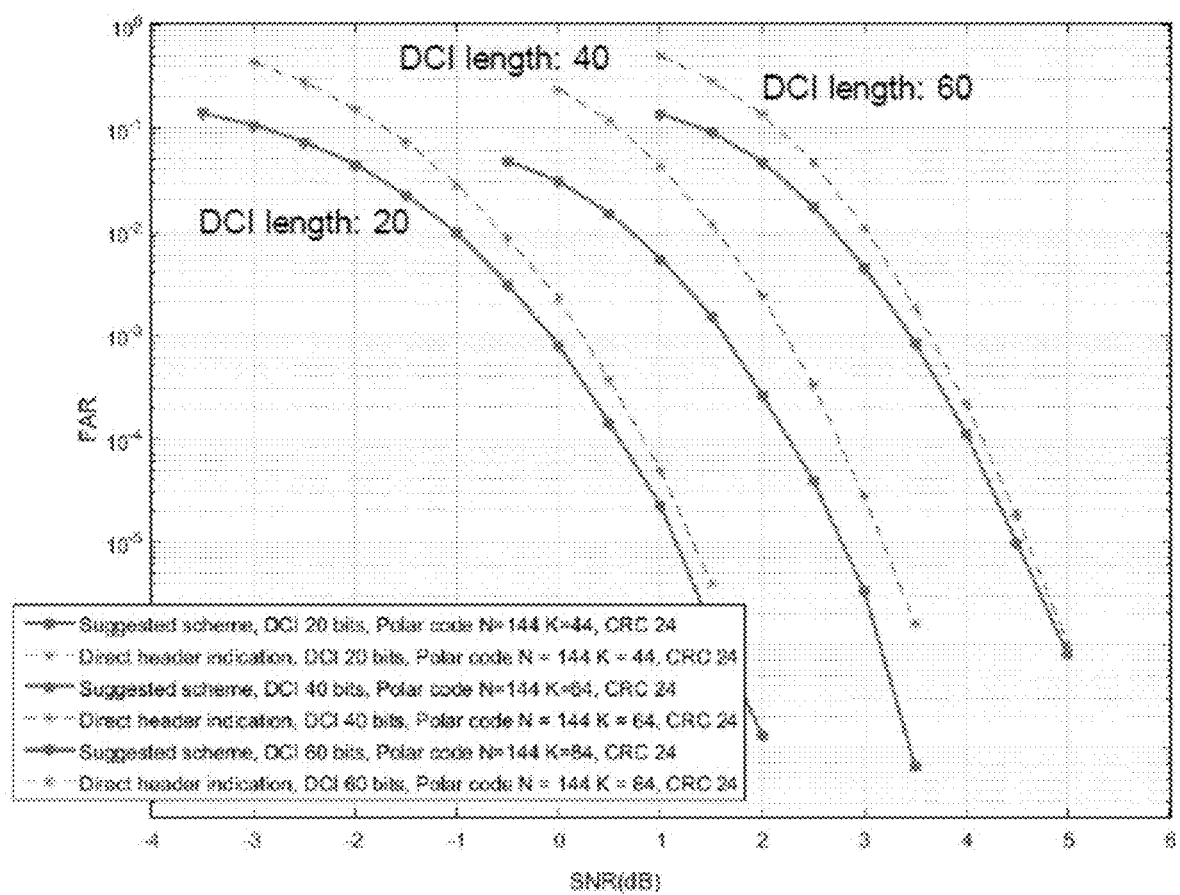
FIG. 7 shows a schematic diagram illustrating a comparison of FAR between the encoding method according to an embodiment and the header indication scheme.

To illustrate the advantages according to the embodiments of present application, FIG. 7 shows a schematic diagram illustrating a comparison of FAR between the encoding method implemented in the embodiments and the direct header indication scheme as a function of a signal-to-noise ratio (SNR), wherein the AL is set to 1 without demodulation reference signal (DMRS). The solid line denotes the results based on the prefix code encoding and the dashed line denotes the results based on the state-of-the-art direct indication by the DCI header.

Figure 8:
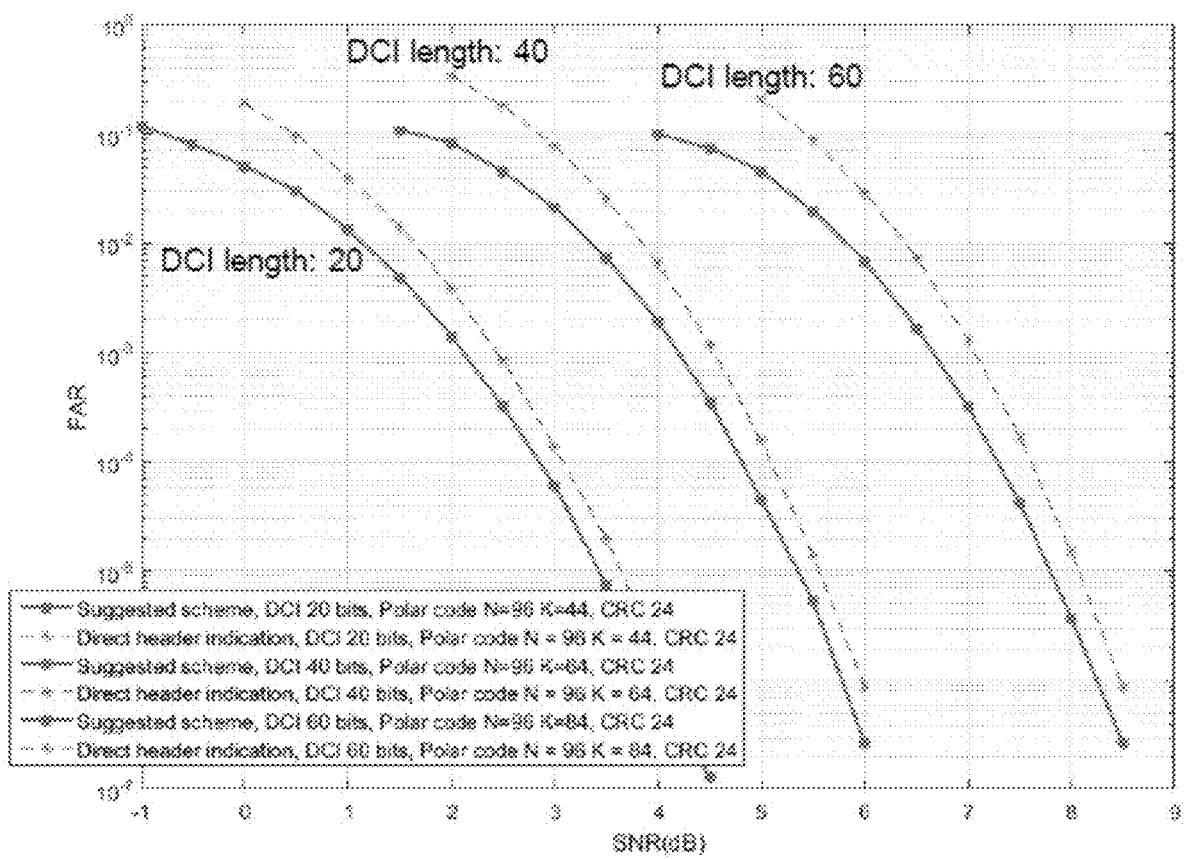
FIG. 8 shows a schematic diagram illustrating a comparison of FAR between the encoding method according to an embodiment and the header indication scheme.

FIG. 8 shows a schematic diagram illustrating a comparison of FAR between the encoding method implemented in the embodiments of the application and the header indication scheme as a function of an SNR, wherein the AL is set to 1 with DMRS overhead 33%. The solid line denotes the results based on the prefix code encoding and the dashed line denotes the results based on the state-of-the-art direct indication by the DCI header.

The results shown in FIGS. 7 and 8 are simulated according to the conditions, firstly, the set of DCI length includes 60, 40, 20 bits and the set of the CIB lengths for the corresponding DCIs are: 57, 53, 50, 47, 45, 43, 41, 40 bits for the DCI with 60 bits; 37, 33, 30, 27, 25, 23, 21 bits for the DCI with 40 bits; and 17, 15, 14, 12, 11, 9 bits for the DCI with 20 bits. Furthermore, the model of Additive White Gaussian Noise (AWGN) channel without memory is used and the following CRC polynomial is used:

$$CRC24(D) = [D^{24} + D^{23} + D^{21} + D^{20} + D^{17} + D^{15} + D^{13} + D^{12} + D^8 + D^4 + D^2 + D + 1].$$

As can be seen in FIGS. 7 and 8, the simulation results show the following advantages according to the embodiments of the application. Firstly, the scheme of inner DCI encoding with a variable length indicator of the information part provides more reliable indication about the CM length, i.e. better FAR performance in comparison with the known direct indication scheme which uses an unprotected header.

Secondly, the suggested scheme according to the embodiments achieves significant SNR gain up to 1.5 decibel (dB) in comparison with the known direct indication scheme. Besides, the embodiments of the application do not require additional redundancy and can keep reasonable complexity that is negligible regarding total BD costs in the NR-PDCCH.

Figure 9:
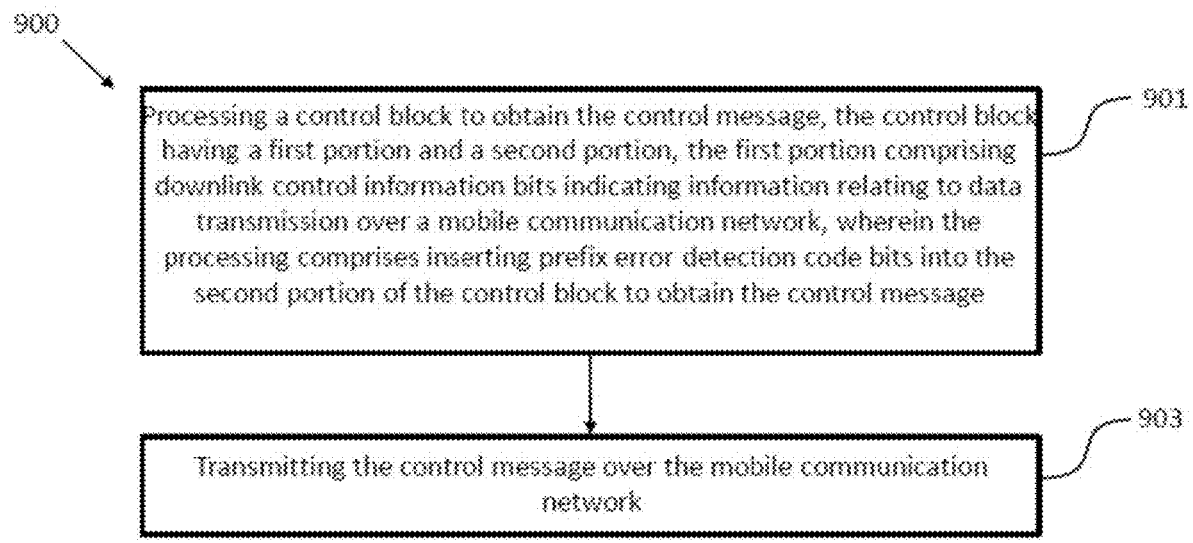
FIG. 9 shows a schematic diagram illustrating a transmission method according to an embodiment.

FIG. 9 shows a schematic diagram illustrating a transmission method 900 for transmitting a control message over a PDCCH towards a communication entity in a mobile communication network 200 according to an embodiment.

The encoding method 900 comprises the following steps.

Step 901. Processing a control block to obtain the control message, the control block having a first portion and a second portion, the first portion comprising downlink control information bits indicating information relating to data transmission over a mobile communication network, wherein the processing comprises inserting prefix error detection code bits into the second portion of the control block to obtain the control message.

Step 903. Transmitting the control message over the mobile communication network.

Figure 10:
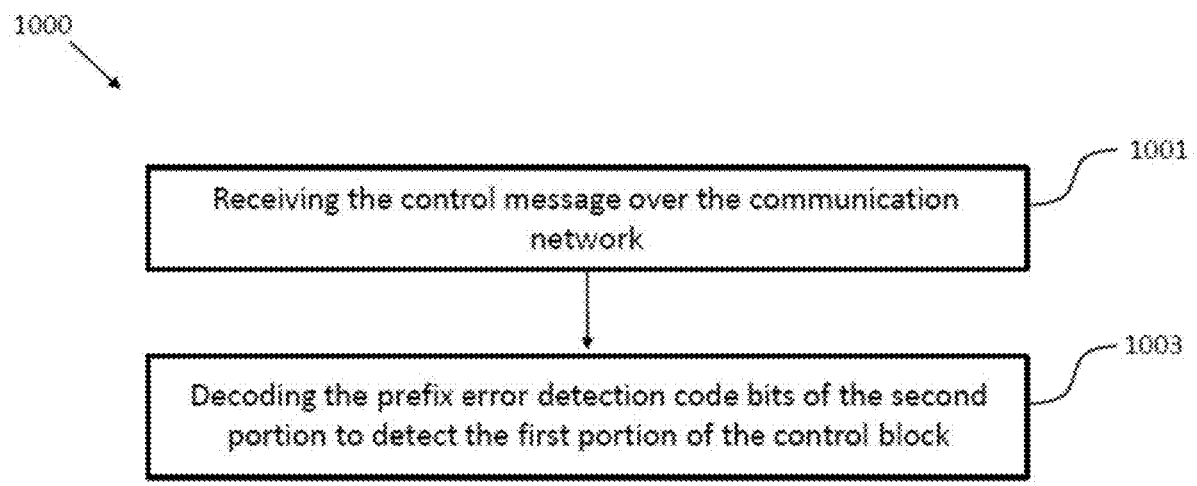
FIG. 10 shows a schematic diagram illustrating a receiving method according to an embodiment.

FIG. 10 shows a schematic diagram illustrating a receiving method 1000 for receiving a control message over a communication network 200 according to an embodiment, wherein the control message comprises a control block 100 and the control block 100 comprises a first portion 101 and a second portion 102, the first portion 101 comprising DCI bits indicating information relating to data transmission over the mobile communication network 200, the second portion 102 comprising prefix error detection code bits.

The receiving method 1000 comprises the following steps.

Step 1001. Receiving the control message over the communication network.

Step 1003. Decoding the prefix error detection code bits of the second portion to reliably define the length of the first portion of the control block.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the application beyond those described herein. While the present application has been described with reference to one or more particular embodiments, those skilled in the art recognize that many changes may be made thereto without departing from the scope of the present application. It is therefore to be understood that within the scope of the appended claims and their equivalents, the application may be practiced otherwise than as described herein.

What is claimed is:

1. A communication transmitter for transmitting a control message over a physical downlink control channel (PDCCH) towards a communication entity in a mobile communication network, wherein the communication transmitter comprises:
a processor configured to:
process a control block, wherein the control block comprises a first portion and a second portion, and wherein the first portion comprises downlink control information (DCI) bits indicating information related to data transmission over the mobile communication network;
replace digital bits of the second portion by prefix error detection code bits in order to insert the prefix error detection code bits into the second portion to indicate a length of the first portion; and
combine the first portion and the second portion to obtain the control message; and
a communication interface coupled to the processor and configured to transmit the control message over the mobile communication network.

2. The communication transmitter of claim 1, wherein the processor is further configured to:
calculate a parity bit upon the first portion; and
insert the parity bit into the second portion to obtain the control message.

3. The communication transmitter of claim 1, wherein the processor is further configured to generate the prefix error detection code bits independent of the DCI bits.

4. The communication transmitter of claim 1, wherein the processor is further configured to generate the prefix error detection code bits to obtain a code word of a variable length and comprising a Hamming distance greater than one.

5. The communication transmitter of claim 1, wherein the processor is further configured to generate the prefix error detection code bits by a set of direct formulae or to select the prefix error detection code bits from a predetermined set of code words, and wherein the predetermined set of code words p comprises lengths depending on the length of the first portion.

6. The communication transmitter of claim 5, wherein the communication interface is further configured to transmit the control message in a certain transmission mode of a plurality of lengths of the first portion, wherein the processor is further configured to generate the prefix error detection code bits by direct formulae or to select the prefix error detection code bits from the predetermined set of code words, and wherein a number of prefix error detection code bits depends on the length of the first portion.

7. The communication transmitter of claim 1, wherein the communication interface is further configured to transmit the control message according to a Long-Term Evolution (LTE) transmission scheme.

8. The communication transmitter of claim 1, wherein the communication transmitter is a base station.

9. A communication receiver for receiving a control message over a communication network, wherein the control message comprises a control block, wherein the control block comprises a first portion and a second portion, wherein the first portion comprises downlink control information (DCI) bits indicating information relating to data transmission over the communication network, wherein the second portion comprises prefix error detection code bits, and wherein the communication receiver comprises:
a Long-Term Evolution (LTE) communication interface configured to receive the control message over the communication network; and
a processor coupled to the LTE communication interface and configured to:
decode the prefix error detection code bits of the second portion in order to obtain decoded bits; and
discard the decoded bits in the control block in order to define a length of the first portion of the control block.

10. The communication receiver of claim 9, wherein the second portion comprises a parity bit, wherein the parity bit is generated from the first portion, and wherein the processor is further configured to detect an error upon a basis of the first portion and the parity bit.

11. A transmission method for transmitting a control message over a physical downlink control channel (PDCCH) towards a communication entity in a mobile communication network, wherein the transmission method comprises:

processing a control block to obtain the control message, wherein the control block comprises a first portion and a second portion, wherein the first portion comprises downlink control information (DCI) bits indicating information relating to data transmission over the mobile communication network, and wherein the processing comprises replacing digital bits of the second portion using prefix error detection code bits in order to insert the prefix error detection code bits into the second portion to obtain a length of the first portion; and transmitting the control message over the mobile communication network.

12. The transmission method of claim 11, further comprising:

calculating a parity bit upon the first portion; and
inserting the parity bit into the second portion to obtain the control message.

13. The transmission method of claim 11, further comprising generating the prefix error detection code bits independent of the DCI bits.

14. The transmission method of claim 11, further comprising generating the prefix error detection code bits to obtain a code word, of a variable length, comprising a Hamming distance greater than one.

15. The transmission method of claim 11, further comprising generating the prefix error detection code bits using a set of direct formulae or selecting the prefix error detection code bits from a predetermined set of code words, wherein the predetermined set of code words comprises lengths depending on a length of the first portion.

16. The transmission method of claim 15, further comprising:

transmitting the control message in a certain transmission mode of a plurality of lengths of the first portion; and
generating the prefix error detection code bits by direct formulae or selecting the prefix error detection code bits from the predetermined set of code words, wherein a number of the prefix error detection code bits depends on the length of the first portion.

17. The transmission method of claim 11, further comprising transmitting the control message according to a Long-Term Evolution (LTE) transmission scheme.

18. The communication receiver of claim 9, wherein the communication receiver is implemented in a user equipment.

19. The communication receiver of claim 9, wherein the prefix error detection code bits comprise a DCI header.

20. The communication receiver of claim 9, further comprising discard the decoded bits in the control block in order to detect the first portion in the control block.

* * * * *